US00RE38406E

(19) United States
(12) Reissued Patent
Faris et al.

(10) Patent Number: US RE38,406 E
(45) Date of Reissued Patent: Jan. 27, 2004

(54) HVAC FAN-POWERED TERMINAL UNIT HAVING PRESET FAN CFM

(75) Inventors: Eugene William Michael Faris, Houston, TX (US); Robert Clayton Crowe, Oliver Springs, TN (US)

(73) Assignee: Nailor Industries of Texas Inc., Houston, TX (US)

(21) Appl. No.: 09/613,549

(22) Filed: Jul. 10, 2000

Related U.S. Patent Documents

Reissue of:
(64) Patent No.: 6,021,252
Issued: Feb. 1, 2000
Appl. No.: 09/007,455
Filed: Jan. 15, 1998

(51) Int. Cl.[7] ..... H02P 7/29
(52) U.S. Cl. ..... 388/831; 388/825; 388/827; 388/829
(58) Field of Search ..... 388/829, 831, 388/915, 827, 825, 826; 318/254, 439

(56) References Cited

U.S. PATENT DOCUMENTS

| | | | | |
|---|---|---|---|---|
| 4,413,212 A | | 11/1983 | Okamoto et al. | |
| 4,500,821 A | | 2/1985 | Bitting et al. | |
| 4,588,934 A | | 5/1986 | Suzuki et al. | |
| 4,757,241 A | | 7/1988 | Young | |
| 4,763,347 A | | 8/1988 | Erdman | |
| 4,978,896 A | | 12/1990 | Shah | |
| 5,075,608 A | * | 12/1991 | Erdman et al. | 318/599 |
| 5,144,812 A | * | 9/1992 | Mills, Jr. et al. | 62/186 |
| 5,254,916 A | * | 10/1993 | Hopkins | 318/443 |
| 5,319,943 A | * | 6/1994 | Bahel et al. | 62/156 |
| 5,457,766 A | | 10/1995 | Ko | |
| 5,559,407 A | * | 9/1996 | Dudley et al. | 318/439 |
| 5,589,749 A | | 12/1996 | Davidson et al. | |
| 5,923,145 A | * | 7/1999 | Reichard et al. | 318/811 |

FOREIGN PATENT DOCUMENTS

GB 2260785 4/1993

* cited by examiner

*Primary Examiner*—Robert E. Nappi
*Assistant Examiner*—Rina I. Duda
(74) *Attorney, Agent, or Firm*—Stevens & Showalter, LLP

(57) ABSTRACT

An arrangement is disclosed for controlling fan motors in fan-powered terminal units which permit the air flow of the terminal units to be factory preset and reset using a voltmeter. The fan motor is responsive to the pulse width of pulses of a pulse width modulated signal to provide an air flow which is proportional to the pulse width. By adjusting the pulse width, the air flow may be set as desired. A pulse width modulated signal having pulses with a set amplitude and frequency is generated. The dc voltage of the pulse width modulated signal is measured using a voltmeter. As the pulses have a set amplitude and frequency, the pulse width of the pulses may be adjusted by controlling the dc voltage of the pulse width modulated signal. The fan motor is programmed to deliver the set air flow over a range of static pressures.

42 Claims, 5 Drawing Sheets

| LOOKUP TABLE FOR 1/2 HP MOTOR | | | | | | | |
|---|---|---|---|---|---|---|---|
| CFM | VDC | CFM | VDC | CFM | VDC | CFM | VDC |
| | | | | | | | |
| 198 | 0.6 | 413 | 3 | 682 | 6 | 950 | 9 |
| 207 | 0.7 | 422 | 3.1 | 691 | 6.1 | 959 | 9.1 |
| 216 | 0.8 | 431 | 3.2 | 700 | 6.2 | 968 | 9.2 |
| 225 | 0.9 | 440 | 3.3 | 709 | 6.3 | 977 | 9.3 |
| 234 | 1 | 449 | 3.4 | 717 | 6.4 | 986 | 9.4 |
| 243 | 1.1 | 458 | 3.5 | 726 | 6.5 | 995 | 9.5 |
| 252 | 1.2 | 467 | 3.6 | 735 | 6.6 | 1004 | 9.6 |
| 261 | 1.3 | 476 | 3.7 | 744 | 6.7 | 1013 | 9.7 |
| 270 | 1.4 | 485 | 3.8 | 753 | 6.8 | 1022 | 9.8 |
| 279 | 1.5 | 494 | 3.9 | 762 | 6.9 | 1031 | 9.9 |
| 287 | 1.6 | 502 | 4 | 771 | 7 | 1040 | 10 |
| 296 | 1.7 | 511 | 4.1 | 780 | 7.1 | 1049 | 10.1 |
| 305 | 1.8 | 520 | 4.2 | 789 | 7.2 | 1058 | 10.2 |
| 314 | 1.9 | 529 | 4.3 | 798 | 7.3 | 1067 | 10.3 |
| 323 | 2 | 538 | 4.4 | 807 | 7.4 | 1076 | 10.4 |
| 332 | 2.1 | 547 | 4.5 | 816 | 7.5 | 1085 | 10.5 |
| 341 | 2.2 | 558 | 4.6 | 825 | 7.6 | 1094 | 10.6 |
| 350 | 2.3 | 565 | 4.7 | 834 | 7.7 | 1103 | 10.7 |
| 359 | 2.4 | 574 | 4.8 | 843 | 7.8 | 1112 | 10.8 |
| 368 | 2.5 | 583 | 4.9 | 852 | 7.9 | 1121 | 10.9 |
| 377 | 2.6 | 592 | 5 | 861 | 8 | 1130 | 11 |
| 386 | 2.7 | 601 | 5.1 | 870 | 8.1 | 1139 | 11.1 |
| 395 | 2.8 | 610 | 5.2 | 879 | 8.2 | 1147 | 11.2 |
| 404 | 2.9 | 619 | 5.3 | 888 | 8.3 | 1156 | 11.3 |
| | | 628 | 5.4 | 897 | 8.4 | 1165 | 11.4 |
| | | 637 | 5.5 | 906 | 8.5 | 1174 | 11.5 |
| | | 646 | 5.6 | 915 | 8.6 | 1183 | 11.6 |
| | | 655 | 5.7 | 924 | 8.7 | 1192 | 11.7 |
| | | 664 | 5.8 | 932 | 8.8 | 1201 | 11.8 |
| | | 673 | 5.9 | 941 | 8.9 | 1210 | 11.9 |

FIG. 7

HVAC FAN-POWERED TERMINAL UNIT HAVING PRESET FAN CFM

Matter enclosed in heavy brackets [ ] appears in the original patent but forms no part of this reissue specification; matter printed in italics indicates the additions made by reissue.

BACKGROUND OF THE INVENTION

The present invention relates in general to heating, ventilating and air-conditioning (HVAC) and, more particularly, to control of a fan powered terminal unit wherein the fan air flow or cubic feet per minute (CFM) can be preset without regard for the installation specifics of the HVAC system in which the terminal unit is to be used. While the fan control will be described with reference to a fan powered terminal unit for which the present invention is initially being applied, it is to be understood that the fan control arrangement of the present application may be used in a variety of HVAC applications including, for example, venting hoods, exhaust fans, supply fans and fan coils.

Fan-powered terminal units which provide variable air volume (VAV) are used for both cooling and heating of perimeter zones of a building. The terminal units use the free heat derived from lighting, people and other equipment within the building by inducing this warmer air from a building core ceiling plenum space and recirculating it to rooms calling for heat. If additional heat is required, supplemental heating coils within the terminal units may be activated thus eliminating the need for a central source of warm air.

Once a HVAC system is installed, it must be set-up by setting the terminal units to provide required air flow for the system. A portion of this set-up currently includes placing a flow measuring hood over an air outlet or diffuser and going into the ceiling to adjust an associated VAV terminal unit to obtain the proper air flow. This portion of the HVAC system set-up adds substantially to the cost with labor related costs currently running around $40 to $60 dollars per terminal unit.

An electronically commutated motor (ECM) is commercially available from General Electric which can provide a fixed air flow for a terminal unit regardless of static pressure provided the static pressures are within a permissible range. The ECM motor is controlled using a pulse width modulation (PWM) control signal with the pulse width being proportional to the air flow which is to be delivered by the terminal unit. Unfortunately, the width of the pulses of the PWM signal can not be readily determined without equipment which is not normally available to manufacturing personnel and HVAC contractors. Accordingly, while the ECM motors offer the promise of being able to preset the air flow for terminal units on the manufacturing floor before shipment and also once installed to accommodate changing conditions of a HVAC system, terminal units currently using ECM motors must still undergo the high cost air flow balancing procedures.

Accordingly, there is a need for an improved control arrangement for fans used in fan-powered terminal units which permit the air flow of the terminal units to be factory preset and reset without the conventional labor intensive balancing procedures currently required. Preferably, the fan control arrangement could be used for a variety of HVAC applications such as venting hoods, exhaust fans, supply fans and fan coils.

SUMMARY OF THE INVENTION

The present invention meets this need by providing an improved open loop control arrangement for fans in fan-powered terminal units which permit the air flow of the terminal units to be factory preset and reset using a voltmeter. The fan is responsive to the pulse width of pulses of a pulse width modulated signal to provide an air flow which is directly proportional to the pulse width. By adjusting the pulse width, the air flow may be set as desired. A pulse width modulated signal having pulses with a set amplitude and frequency is generated. The direct current (dc) voltage of the pulse width modulated signal is measured using a voltmeter. As the pulses have a set amplitude and frequency, the width of the pulses may be adjusted by controlling the dc voltage of the pulse width modulated signal. The fan is programmed to deliver the set air flow over a range of static pressures.

According to a first aspect of the present invention, a method of operating a fan motor in a ventilation system is provided. The fan motor is responsive to the width of pulses of a pulse width modulated signal to provide an air flow corresponding to the pulse width. The method comprises generating a pulse width modulated signal with pulses having a set amplitude. The width of the pulses is adjusted by adjusting the dc voltage of the pulse width modulated signal so that the fan motor provides a predetermined air flow.

The step of adjusting the width of the pulses by adjusting the dc voltage of the pulse width modulated signal so that the fan motor provides a predetermined air flow may be performed manually or automatically. The step of generating the pulse width modulated signal with the pulses having a set amplitude may comprise generating a periodic waveform having a predetermined frequency and a varying amplitude, generating a control signal having a selectable amplitude, and comparing the waveform with the control signal such that the pulses are defined by the portions of the waveform which are less than or equal to the selectable amplitude of the control signal. Preferably, the waveform is a triangular waveform.

The step of adjusting the width of the pulses by adjusting the dc voltage of the pulse width modulated signal so that the fan motor provides a predetermined air flow may comprise the step of controlling the selectable amplitude of the control signal. Preferably, the fan motor provides the predetermined air flow over a range of static pressures. The method may further comprise the step of measuring the dc voltage of the pulse width modulated signal using a digital voltmeter. Preferably, the predetermined frequency of the periodic waveform and the set amplitude of the pulses are substantially constant.

According to another aspect of the present invention, a method of operating a fan motor in a ventilation system is provided. The fan motor is responsive to the width of pulses of a pulse width modulated signal to provide an air flow corresponding to the pulse width. The method comprises generating a pulse width modulated signal with pulses having a set amplitude. A dc voltage of the pulse width modulated signal is measured with a voltmeter. The width of the pulses is adjusted by adjusting the dc voltage of the pulse width modulated signal so that the fan motor provides a predetermined air flow.

The step of adjusting the width of the pulses by adjusting the dc voltage of the pulse width modulated signal so that the fan motor provides a predetermined air flow may be performed manually or automatically. The step of generating a pulse width modulated signal with pulses having a set amplitude may comprise generating a periodic waveform having a predetermined frequency and a varying amplitude, generating a control signal having a predetermined amplitude, and comparing the waveform with the control signal such that pulses are defined by the portions of the waveform which are less than or equal to the predetermined amplitude of the control signal. Preferably, the waveform is a triangular waveform. The step of adjusting the width of the pulses by adjusting a dc voltage of the pulse width modulated signal so that the fan motor provides a predetermined air flow may comprise the step of controlling the predetermined amplitude of the control signal. Preferably, the fan motor provides the predetermined air flow over a range of static pressures. Preferably, the predetermined frequency of the periodic waveform and the set amplitude of the pulses are substantially constant.

According to yet another aspect of the present invention, a method of presetting the air flow generated by a fan motor for a ventilation system for operation within a range of static pressures is provided. A fan motor is provided which is responsive to the width of pulses of a pulse width modulated signal with the width corresponding to the air flow provided by the fan motor. The pulse width modulated signal is generated and the air flow provided by the fan motor is set by adjusting the width of the pulses by using a voltmeter to measure the dc voltage of the pulse width modulated signal, such that the air flow provided by the fan motor is set for static pressures within the range. Preferably, the step of setting the air flow provided by the fan motor by adjusting the width of the pulses by using a voltmeter to measure the dc voltage of the pulse width modulated signal is performed prior to installation of the ventilation system.

According to a further aspect of the present invention, an apparatus for circulating air in a ventilation system comprises a fan motor and a controller. The fan motor is responsive to the width of pulses of a pulse width modulated signal with the width corresponding to an air flow provided by the fan motor. The controller generates the pulses of the pulse width modulated signal. The pulses have a set amplitude and are coupled to the fan motor so that the width of the pulses can be determined by measuring a dc voltage of the pulse width modulated signal for setting the fan motor to provide a predetermined air flow.

The controller may comprise a voltage generator generating a control signal having a selected amplitude, a waveform generator generating a periodic waveform having a predetermined frequency and a varying amplitude, and a comparator generating the pulse width modulated signal in response to the waveform and the control signal, such that the pulse width of the pulses is proportional to the amplitude of the control signal. Preferably, the waveform comprises a triangular waveform and the comparator compares the waveform and the control signal such that the pulses are defined by the portions of the waveform which are less than or equal to the selected amplitude of the control signal.

The voltage generator may further comprise a voltage adjuster for selecting the amplitude of the control signal. The voltage adjuster may comprise a variable resistor or an interface to a control system programmed to automatically select the amplitude of the control signal. The voltage adjuster may further comprise a switching device for selecting one of the variable resistor and the interface to a control system for selecting the amplitude of the control signal. Preferably, the fan motor is an electrically commutated motor and the predetermined air flow is substantially constant over a predetermined range of static pressures. Preferably, the predetermined frequency of the periodic waveform and the set amplitude of the pulses are substantially constant.

According to a still further aspect of the present invention, a controller for controlling the air flow provided by a fan motor in a ventilation system is provided. The fan motor is responsive to the width of pulses of a pulse width modulated signal with the pulse width corresponding to the air flow provided by the fan motor. The controller comprises a voltage generator generating a control signal having a substantially constant predetermined amplitude, a waveform generator generating a periodic waveform having a predetermined frequency and a varying amplitude, and a comparator generating the pulse width modulated signal in response to the waveform and the control signal such that the width of the pulses is proportional to the amplitude of the control signal. Preferably, the predetermined frequency of the periodic waveform and the set amplitude of the pulses are substantially constant.

Preferably, the waveform comprises a triangular waveform and the comparator compares the waveform and the control signal such that the pulses are defined by the portions of the waveform which are less than or equal to the predetermined amplitude of the control signal. The voltage generator may comprise a voltage adjuster for selecting the amplitude of the control signal. The voltage adjuster may comprise a variable resistor or a processor programmed to automatically select the amplitude of the control signal. The voltage adjuster may further comprise a switching device for selecting one of the variable resistor and the processor for selecting the amplitude of the control signal.

Accordingly, it is an object of the present invention to provide an improved control arrangement for fans used in fan-powered terminal units which permit the air flow of the terminal units to be factory preset and reset without the conventional labor intensive balancing procedures currently required. It is another object of the present invention to factory preset and reset the air flow of terminal units using a voltmeter. It is yet another object of the present invention to provide a fan control arrangement which may be used for a variety of HVAC applications such as venting hoods, exhaust fans, supply fans and fan coils. Other features and advantages of the invention will be apparent from the following description, the accompanying drawings and the appended claims.

BRIEF DESCRIPTION OF THE DRAWINGS

FIG. 7 is a table depicting the relationship between the dc voltage of the pulse width modulated signal and the air flow of a particular fan motor used in the fan-powered terminal unit of FIG. 1.

DETAILED DESCRIPTION OF THE PREFERRED EMBODIMENTS

Figure 1:
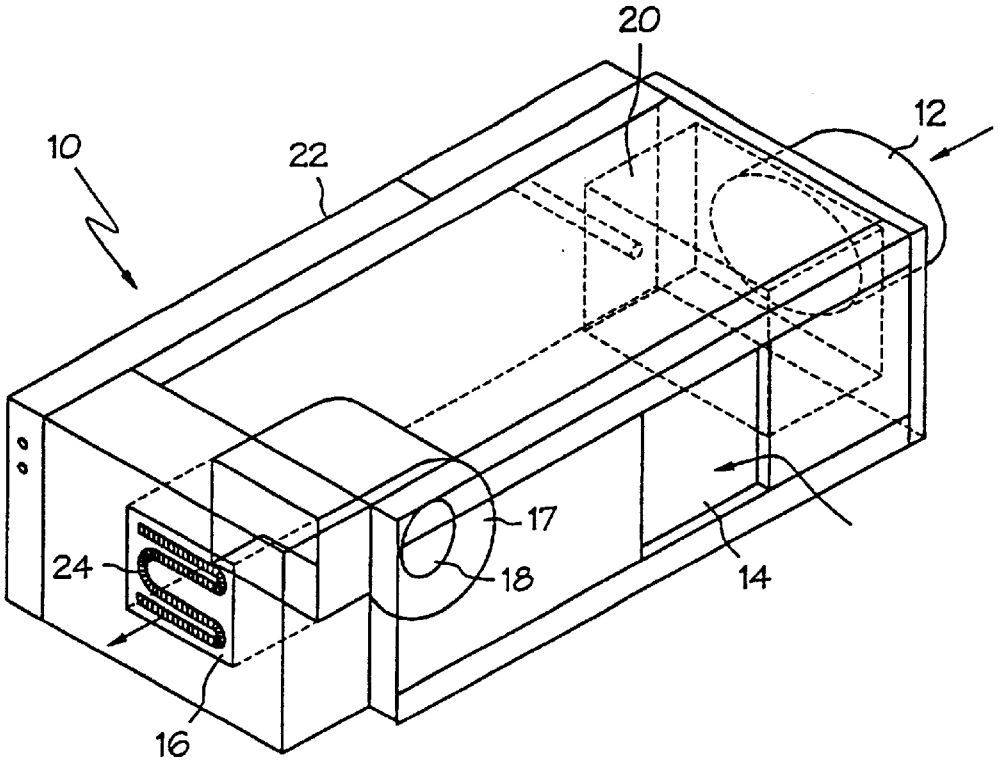
FIG. 1 is a perspective view of a fan-powered terminal unit according to the present invention.

While the present invention is applicable in general to HVAC systems, it will be described herein with reference to a fan-powered terminal unit for use in a commercial building for which it is particularly attractive and in which it is initially being utilized. Referring to FIG. 1, a fan-powered terminal unit 10 is provided having a primary air duct 12, an induced plenum air inlet 14 and a discharge duct 16. The primary air duct 12 receives primary air from the ventilation system (not shown) while the induced plenum air inlet 14 receives warmer plenum air from the building core plenum space (not shown). The warmer plenum air is generated by the free heat derived from people, lighting and other equipment in the building. The primary air duct 12 and the induced plenum air inlet 14 are arranged in series for delivering a desired air flow or cfm to a perimeter zone of a building (not shown) through the discharge duct 16. This type of fan-powered terminal unit 10 is also known as a series unit. It will be appreciated by those skilled in the art that the fan-powered terminal unit 10 may also be configured as a parallel unit.

The fan-powered terminal unit 10 also comprises a fan 17 having a fan motor 18 therein, a primary air valve 20, an electrical controller 22 and an optional heating unit 24. The primary air valve 20 controls the amount of air supplied through the primary air duct 12. The primary air valve 20 is controlled by the electrical controller 22 and has a plurality of positions ranging from fully open to fully closed.

The fan-powered terminal unit 10 is configured to operate continuously when the perimeter zone is occupied. The fan-powered terminal unit 10 mixes primary air with induced plenum air so as to maintain a predetermined or desired air flow or cfm. The fan 17 is positioned within the primary air stream such that all of the air flow of the unit 10 passes through the fan 17. During full cooling demand, a thermostat (not shown) causes the electrical controller 22 to position the primary air valve 20 to fully open while the fan 17 and fan motor 18 maintain the desired air flow by inducing the appropriate amount of return air from the plenum. As the cooling load decreases, the thermostat adjusts the position of the primary air valve 20 to a desired position for the required portion of air from the primary air while the fan 17 driven by the fan motor 18 makes up the difference and maintains the desired air flow by inducing more return air from the plenum. At low cooling loads, the primary air may close or to go a minimum ventilation setting with the bulk of the air flow being supplied from the plenum. If the zone temperature drops further, the termostat will energize the optional heating unit 24 for additional heat. The heating unit 24 may comprise electrical heating coils, hot water heat or other appropriate heating devices.

The fan motor 18 is an integrated control motor (ICM)/electrically commutated motor (ECM) commercially available from General Electric Industrial Control Systems (GE). The fan motor 18 is programmed by GE so that when used to drive the fan 17 in the terminal unit 10, a substantially constant air flow is delivered over a range of static pressures based on information supplied by the end user. The air flow is variable and may be set to a desired value consistent with the programming by GE. Once the desired air flow is set, the fan motor 18 will operate to supply the desired air flow as long as the static pressures encountered by the terminal unit 10 are within the specified range.

The ICM fan motor 18 is a direct current (dc) motor with a built-in invertor. Direct current motors are more energy efficient and easier to control than alternating current (ac) motors. Additionally, the fan motor 18 includes soft starts, slewed speed ramps, ball bearings, wider operating ranges and lower operating temperatures. Soft starts and slewed speed ramps eliminate start-up noises and vibrational stress transmitted to mounting brackets or hardware. The ball bearings provide permanent lubrication that permits operation at low rpm's (revolutions per minute) unlike sleeve bearings which require a minimum operating speed for oiling. Wider operating ranges give the user increased flexibility to change floor plans without having to replace an entire fan-powered terminal unit 10. The lower operating temperature of the fan motor 18 requires less energy to offset the heat gain from the motor. The commercial version of the fan motor 18 operates from a 277 VAC line, standard for most business and commercial buildings. The fan motor 18 currently is available in a variety of ratings ranging from ¼ to 1 horsepower. It should be apparent that the range of air flow is dependent, in part, on the horsepower rating of the fan motor 18.

Figure 2:
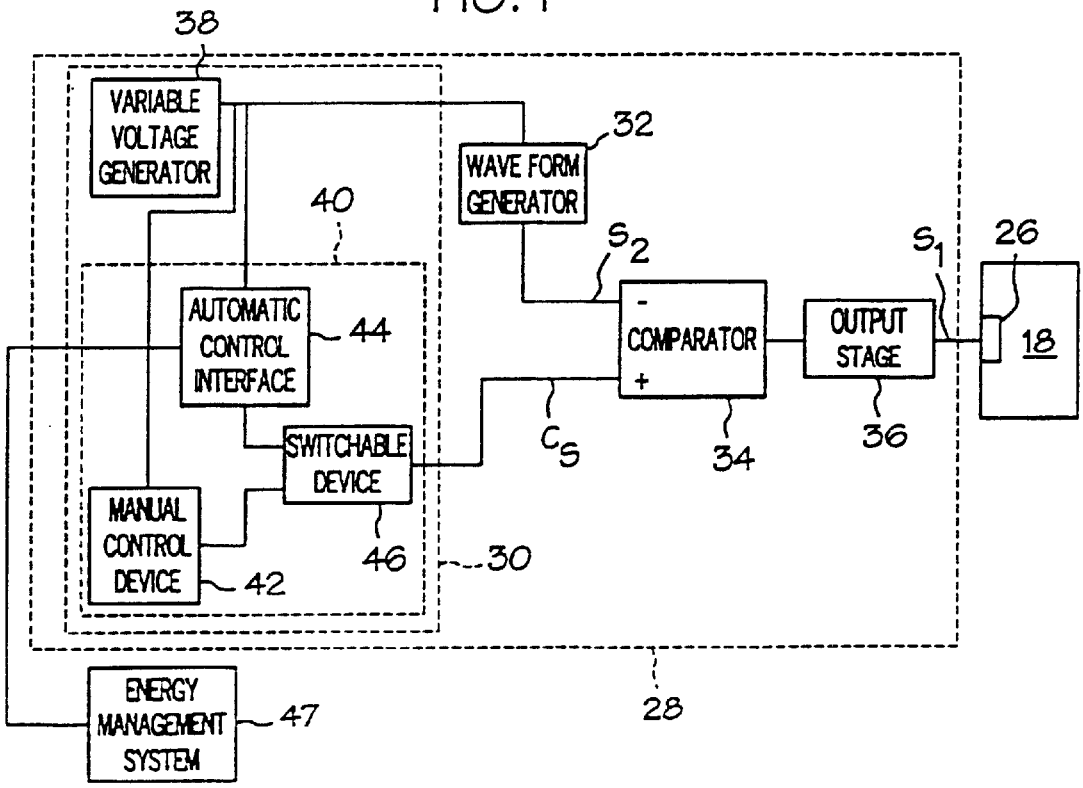
FIG. 2 is a schematic block diagram of a controller for controlling a fan motor in the fan-powered terminal unit of FIG. 1.
Figure 3:
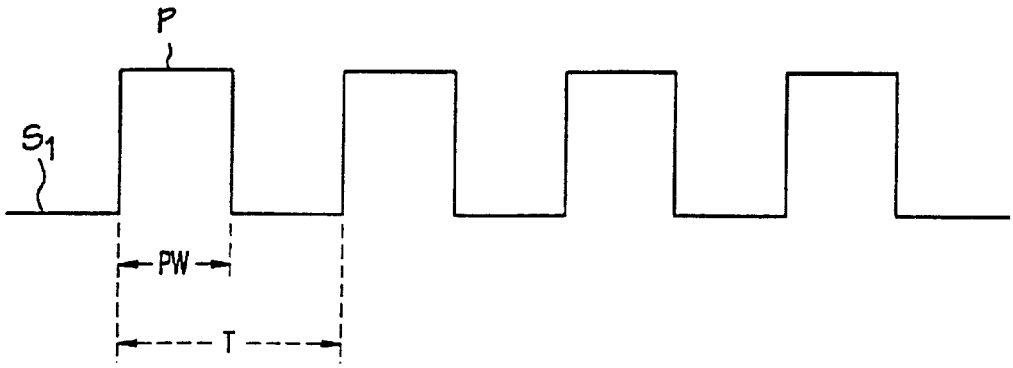
FIG. 3 is an illustration of a representative pulse width modulated signal used to control the air flow of the fan motor of FIG. 1.

The fan motor 18 is controlled by a pulse width modulated signal with the desired air flow through the terminal unit 10 being proportional to the width of the pulses of the pulse width modulated signal. As shown in FIGS. 2 and 3, the fan motor 18 includes an internal processor 26 which receives a pulse width modulated signal $S_1$ generated by a controller 28. As shown in FIG. 3, the pulse width modulated signal $S_1$ is a pulsed dc square wave with a time period T and a plurality of pulses P each having a pulse width PW. The pulse width PW of the pulses P may vary from zero (0% duty cycle) to the entire time period T (100% duty cycle). The internal processor 26 determines the pulse width PW of the pulses P of the pulse width modulated signal $S_1$ and controls the fan motor 18 accordingly. In the illustrated embodiment, the air flow provided by the fan motor 18 increases as the pulse width PW increases. However, it will be appreciated by those skilled in the art that the air flow provided by the fan motor 18 may be inversely proportional to the pulse width PW.

Directly measuring and adjusting the pulse width PW normally requires equipment which is not readily available to manufacturing and field personnel since pulse parameters other than pulse width PW can vary from controller to controller and over the range of pulse width which can be generated with currently available controllers. However, in accordance with the present invention, the controller 28 generates a pulse width modulated signal $S_1$ with pulses P having a substantially constant amplitude and a substantially constant frequency. Accordingly, the pulse width PW may be measured by measuring the dc voltage of the pulse width modulated signal $S_1$ as the measured voltage is directly proportional to the pulse width PW. The measured dc voltage of a square wave using a voltmeter, such as digital voltmeters, is a time based average of the signal $S_1$ as the voltmeter expects to receive a constant input. This measured value is therefore dependent upon the pulse width PW, the amplitude of the pulses P and the frequency of the pulses P. With the amplitude and frequency substantially constant, variations in the dc voltage of the pulse width modulated signal $S_1$ will correspond directly to variations in the pulse width PW. The voltage read by the voltmeter will range from 0 volts dc when the duty cycle is 0% to the full voltage amplitude of the pulse P when the duty cycle is 100%. Using the present invention, the pulse width PW may therefore be measured and subsequently adjusted by measuring the dc voltage of the pulse width modulated signal $S_1$ with a voltmeter.

Referring again to FIG. 2, the controller 28 comprises a variable voltage generator 30, a waveform generator 32, a comparator 34 and an output stage 36. The voltage generator 30 comprises a variable voltage generator 38 and a voltage adjuster 40. The voltage adjuster 40 comprises a manual control device 42, an automatic control interface 44 and a switching device 46. The variable voltage generator 38 outputs a substantially constant voltage as a reference voltage for the controller 28. As will be apparent, the automatic control interface 14 could be only an electrical conductor if the control system to which it is interfaced provides appropriate control signals.

Figure 4:
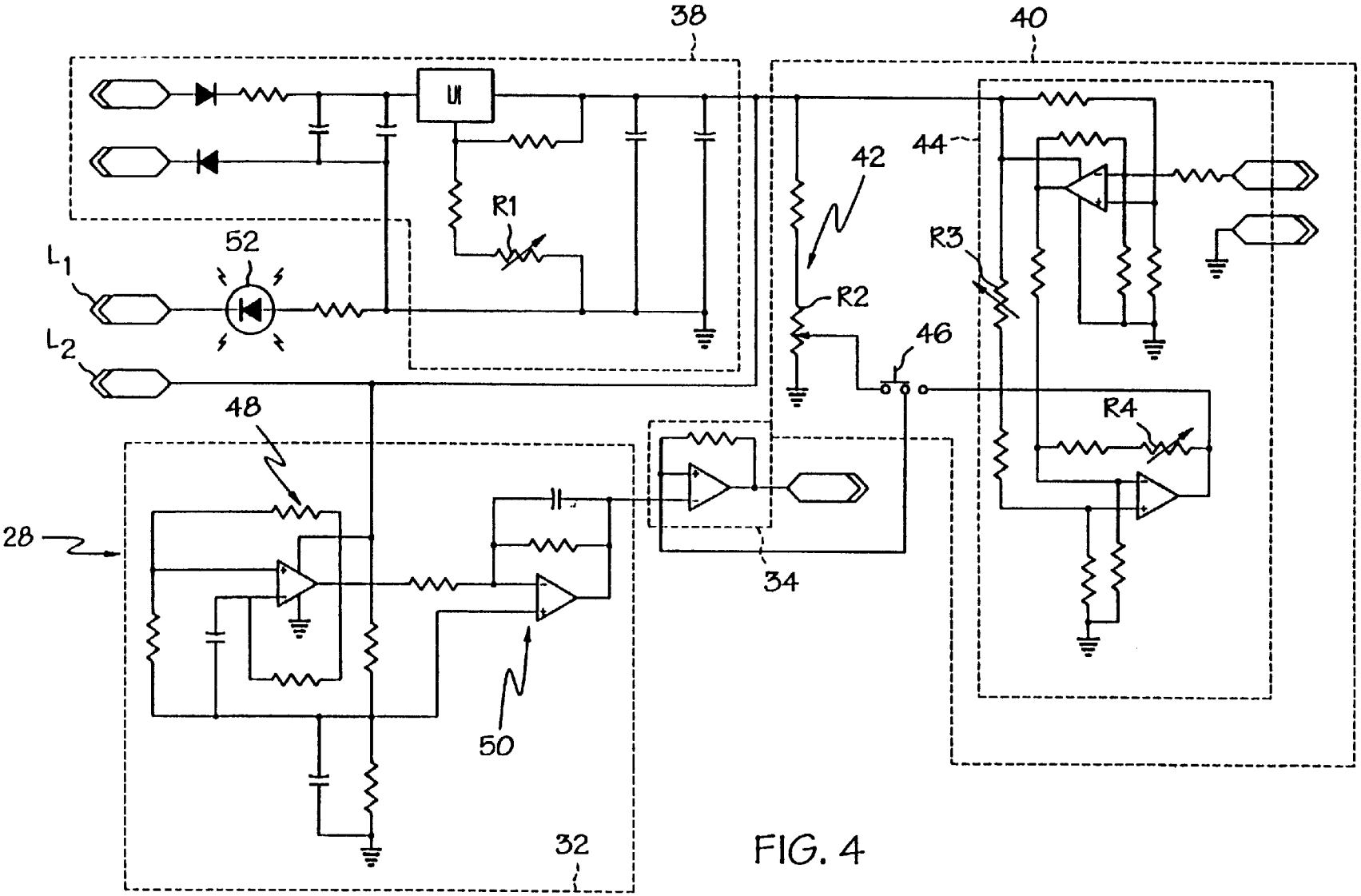
FIG. 4 is schematic diagram of the controller of FIG. 2.

As shown in FIGS. 2 and 4, the variable voltage generator 38 receives a 24 volts ac signal as an input. The 24 volts ac signal is rectified and maintained at a substantially constant value by a variable voltage regulator U1. The output voltage level of the variable voltage generator 38 is set by a variable resistor R1. In the illustrated embodiment, the variable resistor $R_1$ is adjusted until the output voltage is approximately 13.88 volts dc unloaded or approximately 13.5 volts dc loaded. The controller 28 is loaded when it is coupled to the fan motor 18. However, it will be appreciated by those skilled in the art that other voltage levels may be used. The variable voltage regulator U1 is configured so that the set voltage level is substantially constant and accurate to within 1 part in 1400 (±0.07%) using a commercially available LM317LZ integrated circuit.

The output from the variable voltage generator 38 is transmitted to the manual control device 42 and the automatic control interface 44 so that a predetermined or selectable control signal may be generated. The control signal is used to set the pulse width PW of the pulses P, and hence, the air flow provided by the fan motor 18. In the illustrated embodiment, the manual control device 42 comprises a potentiometer or variable resistor $R_2$. The resistance of the variable resistor $R_2$ may be changed by actuating a control element such as a slide or screw (not shown). As the output voltage from the variable voltage generator 38 is substantially constant, once the desired resistance of the variable resistor $R_2$ is set, the variable resistor $R_2$ will output a control signal which is also substantially constant.

The automatic control interface 44 is a signal conditioning circuit configured to output a substantially constant control signal in direct relation to a 0–10 volt dc input signal. The output voltage from the automatic control interface 44 is directly proportional to the voltage level of the 0–10 volt dc input signal. As the control signal is used to control the pulse width PW, the air flow provided by the fan motor 18 is therefore directly proportional to the voltage level of the input signal. The input signal may be controlled remotely from a control system such as an energy management system 47 or any other system which generates a 0–10 volt signal corresponding to the desired air flow. It will be appreciated by those skilled in the art that the automatic control interface 44 may be configured to output the substantially constant control signal in direct relation to other input signals, such as a 0–135 ohms signal, a 0–5 volts dc signal, a 4–20 milliamps signal, a chopped wave signal and a pulse wave modulated signal. The fan-powered terminal unit 10 having a fan motor 18 controlled through the automatic control interface 44 may deliver variable air flow as desired and as programmed by the system controlling the input signal to the automatic control interface 44.

The switching device 46 is coupled to the manual control device 42 and the automatid control interface 44. The switching device 46 is configured to select either manual control or automatic control of the control signal. In the illustrated embodiment, the switching device 46 comprises a shunt device with a shorting jumper. However, it will be appreciated by those skilled in the art that the switching device 46 may comprise any appropriate manual or electrically operable switching device. The output from the switching device 46 is coupled to the positive input of the comparator 34.

Figure 5:
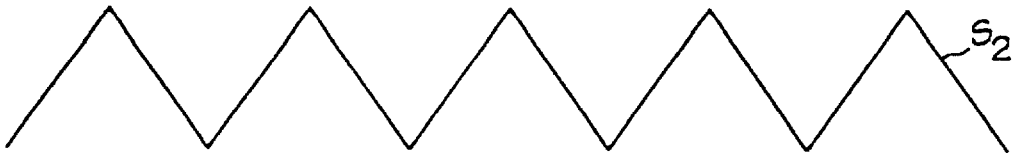
FIG. 5 is a illustration of a true triangular waveform generated by the controller of FIG. 2.

The waveform generator 32 supplies a periodic waveform having a substantially constant frequency and a varying amplitude to the negative input of the comparator 34. In the illustrated embodiment, the waveform generator 32 generates a true triangular waveform $S_2$ as shown in FIG. 5. A true triangular waveform is a periodic waveform having successive positive-going and negative-going ramp changes substantially equal to each other with a slope of 1 and −1, respectively. However, it will be appreciated by those skilled in the art that other waveforms having a substantially constant frequency and varying amplitude, such as a precision sawtooth waveform, may be used.

Referring again to FIGS. 2 and 4, the waveform generator 32 comprises a square wave generator 48 and an integrator 50 to generate the true triangular waveform $S_2$. The square wave generator 48 is configured to generate a square wave having a 50% duty cycle, a substantially constant amplitude and a substantially constant frequency. The integrator 50 integrates the square wave to form the true triangular waveform $S_2$. Since the square wave has a 50% duty cycle and a substantially constant amplitude, the positive-going and negative-going ramp changes of the triangular waveform $S_2$ with be substantially equal to each other and the slopes of the ramps will be approximately 1 and −1, respectively. Further, since the square wave has a substantially constant frequency, the frequency of the triangular wave $S_2$ will also be substantially constant.

In the illustrated embodiment, the integrator 50 is configured to generate an output ranging from approximately 1.5 volts dc to approximately 11 volts dc while the fan motor 18 is configured to accept a substantially constant frequency control signal in the range of 80 to 115 Hz. The controller 28 is configured to generate a triangular waveform $S_2$, and correspondingly, a pulse width modulated signal $S_1$, having a substantially constant frequency of approximately 108 Hz. It will be appreciated by those skilled in the art that the integrator 50 may be configured to generate other suitable output voltage ranges and frequencies as required for a given application.

Figure 6:
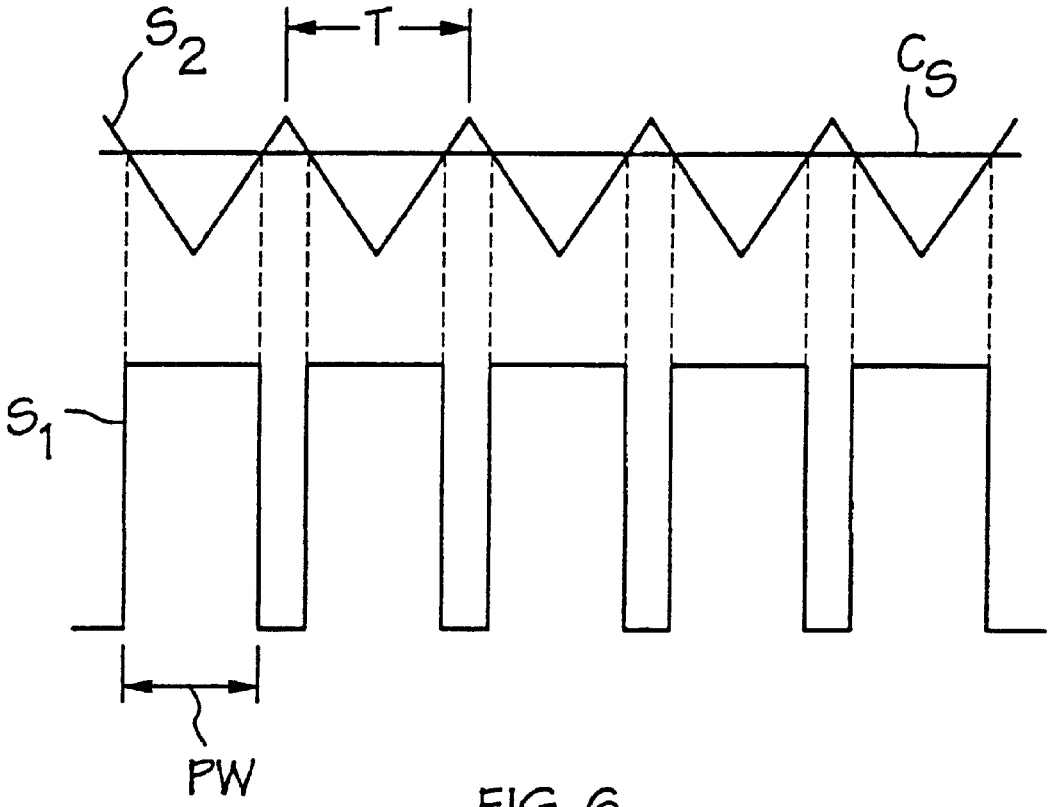
FIG. 6 is an illustration of the interaction of the waveforms generated by the controller of FIG. 2 to produce the pulse width modulated signal for the fan motor of FIG. 1.

Referring now to FIG. 6, the output signal from the comparator 34 is high whenever the voltage level of the triangular waveform $S_2$ is less than the voltage of the control signal CS. The comparator 34 therefore generates the pulse width modulated signal $S_1$ based on the relative voltages of the control signal CS and the triangular waveform $S_2$. The pulse width PW may be increased or decreased by increasing or decreasing the voltage of the control signal CS, respectively. The pulses P are centered within the time periods T. However, it will be appreciated by those skilled in the art that the pulses may be formed along the leading edge of the pulse P, the trailing edge of the pulse P, or anywhere in between depending on the configuration of the periodic waveform generated by the waveform generator 32. The comparator 34 is also set up to generate a pulse width modulated signal $S_1$ having a substantially constant amplitude. With the frequency and amplitude substantially constant, the pulse width PW and the dc voltage of the pulse width modulated signal $S_1$ are directly proportional to the voltage of the control signal CS.

It should be apparent that in order for the duty cycle of the pulse width modulated signal $S_1$ to vary between 0% and 100%, the voltage of the control signal CS will need to vary between the upper and lower voltage limits of the triangular waveform $S_2$. The manual control device 42 does not require any calibration as the variable resistor $R_2$ is merely adjusted between the upper and lower voltage limits of the triangular waveform $S_2$ until the desired dc voltage of the pulse width modulated signal $S_1$, and hence, the desired pulse width PW, is achieved. For example, as the dc voltage of the pulse width modulated signal S1 is the only measured quantity, if a duty cycle of 0% is desired, the extent to which the voltage of the control signal CS is less than the lower voltage limit of the triangular waveform $S_2$ is irrelevant to the controller 28 since the duty cycle will be zero until the voltage level of the control signal CS exceeds the lower voltage limit of $S_2$.

However, the automatic control interface 44 needs to be calibrated for proper operation. The automatic control interface 44 may be calibrated as follows. The input voltage of the automatic control interface 44 is set to 0 volts dc and the variable resistor $R_4$ and is appropriately adjusted until the dc voltage of the pulse width modulated signal $S_1$ is 0 volts dc. The input voltage is then set to 10 volts dc and the variable resistor $R_3$ is appropriately adjusted until the dc voltage of the pulse width modulated signal $S_1$ is 10 volts dc. The automatic control interface 44 is thus calibrated so that the dc voltages of the pulse width modulated signal $S_1$, and correspondingly, the pulse width PW of the pulses P are directly proportional to the input voltages to the automatic control interface 44.

The pulse width modulated signal $S_1$ from the comparator 34 is preferably transmitted to the output stage 36 for conditioning prior to transmission to the fan motor 18. It will be appreciated by those skilled in the art that the output stage 36 may be integrally formed with the comparator 34 thereby alleviating the need for a separate output stage 36. The controller 28 also comprises a pair of lines L1 and L2 for receiving a signal from the processor 26 of the fan motor 18 indicative of the operating speed of the fan motor 18. The signal from the processor 26 of the fan motor 18 causes an LED 52 to flash a predetermined number of times depending on the speed of the fan motor 18 so that the motor speed can be visually perceived.

A table may be generated showing the correlation between the dc voltage of the pulse width modulated signal $S_1$ and the air flow or cfm generated by a particular fan motor 18 programmed by GE for a particular application. One such table is shown in FIG. 7 for a ½ hp motor used in a series fan-powered terminal unit. As shown in the table, the fan motor 18 is programmed to delivered cfm ranging from approximately 251 cfm at 0 volts dc to approximately 1348 cfm at 13.5 volts dc. The fan motor 18 is programmed so that the fan motor 18 delivers the full range of cfm over a range of static pressures. The range of static pressures varies from application to application such that this is one of the factors which is used when the fan motor 18 is programmed by GE. The automatic control interface 44 commands the same range of air flows and pulse widths in response to the 0–10 volt dc input signal.

The user must supply GE with data for a number of variables so that the fan motor 18 may be programmed for the particular application in which it is needed, for example, a fan-powered terminal unit. A test fan motor 18 with horsepower rating capable of generating the desired cfm range for a particular application is used to generate the necessary data. The test fan motor 18 is installed in the fan-powered terminal unit 10 which has been designed for use in the particular application in the field. The following steps are then used to generate the necessary data:

1. The terminal unit 10 is set up under laboratory conditions as it is designed to be used in the field except the discharge duct is configured for nearly zero static pressure.
2. A dampering device is positioned within the discharge duct system along with a measuring device for measuring static pressure and air flow or cfm.
3. The controller 28 is set to its maximum set voltage point. The cfm and the static pressure in the discharge duct system is measured by the measuring device. The cfm is converted to standard cfm (scfm) which is cfm adjusted for barometric pressure, humidity, etc. The watts, volts, amps and rpm of the test fan motor 18 are measured using appropriate measuring devices. The dc voltage of the pulse width modulated signal $S_1$ is also measured using a digital voltmeter.
4. The dampering device in the discharge duct is adjusted to a new setting and step 3 is repeated.
5. Step 4 is repeated until the maximum static pressure rating in which the terminal unit 10 is expected to work is exceeded.
6. The controller 26 is set to a new voltage point and steps 3–5 are repeated.
7. Step 6 is repeated at regular intervals, preferably around 2 volt intervals, until the minimum set voltage point of the controller 26 is reached.
8. If there will be inlet static pressure changes, steps 3 through 7 are repeated for the full range of inlet static variations that the fan will experience.

Once the test has been completed for the full range of inlet and outlet static pressures, the above data generated during the test is sent to GE so that GE can develop the necessary program for the fan motor 18. The programmed fan motor 18 is then able to generate the desired cfm or air flow over an acceptble range of inlet and/or outlet static pressures. Air flow is thus dependent of static pressure within the acceptable range. If the desired range of air flow or cfm is not achieved, a fan motor 18 having a different horsepower rating may need to be used. Additional information regarding the fan motor 18 and programming the internal processor 26 of the fan motor 18 for constant air flow can be obtained from GE and forms no part of the present invention.

Having described the invention in detail and by reference to preferred embodiments thereof, it will be apparent that modifications and variations are possible without departing from the scope of the invention defined in the appended claims.

APPENDIX A

TEST RESULTS OF DIGITAL DC VOLTMETER MEASUREMENTS FOR GIVEN CFM/PULSE WIDTH

| | | | | | Voltmeter Make and Model | | | | |
|---|---|---|---|---|---|---|---|---|---|
| Test No. | Fan CFM | Fan RPM | Pulse Width (mm) | Target Voltage | Fluke Model 23 | Amprobe Model AM-1250 | Radio Shack Model 22174B | Fluke Model 25 | Triplet Model 3303 |
| 1 | 128 | 301 | 8 | 1.0 | 1.0 | 1.0 | 1.2 | 1.0 | 1.0 |
| 2 | 160 | 370 | 22 | 3.0 | 3.0 | 3.0 | 3.1 | 3.0 | 3.0 |
| 3 | 202 | 469 | 34 | 4.8 | 4.8 | 4.8 | 5.0 | 4.8 | 4.8 |
| 4 | 258 | 586 | 48 | 7.1 | 7.1 | 7.1 | 7.1 | 7.1 | 7.1 |

APPENDIX A-continued

TEST RESULTS OF DIGITAL DC VOLTMETER MEASUREMENTS FOR GIVEN CFM/PULSE WIDTH

| | | | | | Voltmeter Make and Model | | | | |
|---|---|---|---|---|---|---|---|---|---|
| Test No. | Fan CFM | Fan RPM | Pulse Width (mm) | Target Voltage | Fluke Model 23 | Amprobe Model AM-1250 | Radio Shack Model 22174B | Fluke Model 25 | Triplet Model 3303 |
| 5 | 311 | 672 | 62 | 9.0 | 9.0 | 9.0 | 9.0 | 9.2 | 9.0 |
| 6 | 426 | 974 | 84 | 12.1 | 12.1 | 12.1 | 12.3 | 12.1 | 12.1 |

Test Performed on Apr. 21, 1999

What is claimed is:

1. A method of open loop operating a fan motor in a ventilation system to obtain a predetermined air flow rate, wherein an internal processor determines a pulse width of pulses of a pulse width modulated signal and controls said fan motor accordingly, said method comprising the steps of:

generating a pulse width modulated signal having pulses with a substantially constant amplitude;

monitoring said pulse width modulated signal using a voltmeter measuring dc voltage; and, adjusting said pulse width of said pulses of said pulse width modulated signal to obtain a preselected reading on said voltmeter, said preselected reading corresponding to said predetermined air flow rate.

2. The method of claim 1, wherein said step of adjusting said pulse width of said pulses by adjusting a dc voltage of said pulse width modulated signal so that said fan motor provides a predetermined air flow is performed manually.

3. The method of claim 1, wherein said step of adjusting said pulse width of said pulses by adjusting a dc voltage of said pulse width modulated signal so that said fan motor provides a predetermined air flow is performed automatically.

4. The method of claim 1, wherein said step of generating said pulse width modulated signal with said pulses having a set amplitude comprises the steps of:

generating a periodic waveform having a predetermined frequency and a varying amplitude;

generating a control signal having a selectable amplitude; and comparing said waveform with said control signal such that said pulses are defined by the portions of said waveform which are less than or equal to said selectable amplitude of said control signal.

5. The method of claim 4, wherein said waveform is a triangular waveform.

6. The method of claim 4, wherein said step of adjusting said pulse width of said pulses by adjusting a dc voltage of said pulse width modulated signal so that said fan motor provides a predetermined air flow comprises the step of controlling said selectable amplitude of said control signal.

7. The method of claim 4, wherein said predetermined frequency of periodic waveform is substantially constant.

8. The method of claim 1, wherein said set amplitude of said pulses is substantially constant.

9. The method of claim 1, wherein said fan motor provides said predetermined air flow over a range of static pressures.

10. The method of claim 1, further comprising the step measuring said dc voltage of said pulse width modulated signal using a digital voltmeter.

11. A method of open loop operating a fan motor in a ventilation system to obtain a predetermined air flow rate, wherein an internal processor determines a pulse width of pulses of a pulse width modulated signal and controls said fan motor accordingly, said method comprising the steps of:

generating a pulse width modulated signal having pulses with a substantially constant amplitude;

measuring a voltage of said pulse width modulated signal using a voltmeter measuring a dc voltage; and adjusting said pulse width of said pulses of said pulse width modulated signal to obtain a preselected reading on said voltmeter, said preselected reading corresponding to said predetermined air flow rate.

12. The method of claim 11, wherein said step of adjusting said pulse width of said pulses by adjusting said dc voltage of said pulse width modulated signal so that said fan motor provides a predetermined air flow is performed manually.

13. The method of claim 11, wherein said step of adjusting said pulse width of said pulses by adjusting said dc voltage of said pulse width modulated signal so that said fan motor provides a predetermined air flow is performed automatically.

14. The method of claim 10, wherein said step of generating a pulse width modulated signal with pulses having a set amplitude comprises the steps of:

generating a periodic waveform having a predetermined frequency and a varying amplitude;

generating a control signal having a predetermined amplitude; and comparing said waveform with said control signal such that said pulses are defined by the portions of said waveform which are less than or equal to said predetermined amplitude of said control signal.

15. The method of claim 14, wherein said waveform is a triangular waveform.

16. The method of claim 14, wherein said step of adjusting said pulse width of said pulses by adjusting a dc voltage of said pulse width modulated signal so that said fan motor provides a predetermined air flow comprises the step of controlling said predetermined amplitude of said control signal.

17. The method of claim 14, wherein said predetermined frequency of said periodic waveform is substantially constant.

18. The method of claim 11, wherein said set amplitude of said pulses is substantially constant.

19. The method of claim 11, wherein said fan motor provides said predetermined air flow over a range of static pressures.

20. An open loop method of presetting the air flow generated by a fan motor for a ventilation system for operation within a range of static pressures, said method comprising the steps of:

providing a fan motor having an internal processor to determine a pulse width of pulses of a pulse width modulated signal and to control said fan motor accordingly, said pulse width corresponding to the air flow provided by said fan motor;

generating said pulse width modulated signal to have pulses with a substantially constant amplitude; and setting the air flow provided by said fan motor by adjusting said pulse width of said pulses to obtain a preselected reading on a voltmeter measuring dc voltage, said preselected reading corresponding to the air flow, such that the air flow provided by said fan motor is set for static pressures within said range.

21. The method of claim 20, wherein said step of setting the air flow provided by said fan motor by adjusting said pulse width of said pulses by using a voltmeter to measure the dc voltage of said pulse width modulated signal is performed prior to installation of said ventilation system.

22. An apparatus for circulating air in a ventilation system, said apparatus comprising:

a fan motor having an internal processor to determine a pulse width of pulses of a pulse width modulated signal and to control said fan motor accordingly, said fan motor providing a predetermined air flow rate corresponding to said pulse width in an open loop manner; and a controller generating said pulses of said pulse width modulated signal, said pulses having a substantially constant amplitude such that said predetermined air flow rate may be obtained by monitoring said pulse width modulated signal with a voltmeter measuring dc voltage to obtain a preselected reading on said voltmeter, said preselected reading corresponding to said predetermined air flow rate.

23. The apparatus of claim 22, wherein said controller comprises a voltage generator generating a control signal having a selected amplitude;

a waveform generator generating a periodic waveform having a predetermined frequency and a varying amplitude; and a comparator generating said pulse width modulated signal in response to said waveform and said control signal, said pulse width of said pulses being proportional to the amplitude of said control signal.

24. The apparatus of claim 23, wherein said waveform comprises a triangular waveform, and wherein said comparator compares said waveform and said control signal such that pulses are defined by the portions of said waveform which are less than or equal to said selected amplitude of said control signal.

25. The apparatus of claim 23, wherein said voltage generator further comprises a voltage adjuster for selecting the amplitude of said control signal.

26. The apparatus of claim 25, wherein said voltage adjuster comprises a variable resistor.

27. The apparatus of claim 25, wherein said voltage adjuster comprises an interface to a control system programmed to automatically select the amplitude of said control signal.

28. The apparatus of claim 25, wherein said voltage adjuster comprises a variable resistor for manually selecting the amplitude of said control signal, an interface to a control system programmed to automatically select the amplitude of said control signal, and a switching device for selecting one of said variable resistor and said interface for selecting the amplitude of said control signal.

29. The apparatus of claim 23, wherein said predetermined frequency of said periodic waveform is substantially constant.

30. The apparatus of claim 22, wherein said set amplitude of said pulses is substantially constant.

31. The apparatus of claim 22, wherein said fan motor is an electrically commutated motor.

32. The apparatus of claim 22, wherein said predetermined air flow is substantially constant over a predetermined range of static pressures.

*33. An apparatus for circulating air in a ventilation system, said apparatus comprising:*

*a fan motor that is responsive to a pulse width modulated signal and is capable of providing one of a plurality of air flows in response to one of a plurality of pulse widths of said pulse width modulated signal, each of said plurality of air flows corresponding to one of said pulse widths of said pulse width modulated signal; and*

*a controller for generating said pulse width modulated signal with one of said plurality of pulse widths in response to a control signal generated by selection of one of a plurality of readable control signal values, each of said plurality of pulse widths corresponding to one of said control signal values, said selection thereby setting said fan motor to provide a predetermined air flow corresponding to said control signal value in an open loop manner.*

*34. An apparatus as claimed in claim 33, wherein said controller comprises:*

*a waveform generator generating a periodic waveform having a predetermined frequency and a varying amplitude; and*

*a comparator generating said pulse width modulated signal in response to said waveform and said control signal, said pulse width of said pulses being proportional to the amplitude of said control signal.*

*35. An apparatus as claimed in claim 34 wherein said control signal is generated by a manual control device.*

*36. An apparatus as claimed in claim 34 herein said control signal is generated by an automatic control system.*

*37. An apparatus as claimed in claim 33 wherein said controller generates said pulse width modulated signal to have a set amplitude for all pulse widths of said pulse width modulated signal so that said pulse widths of said pulse width modulated signal can be read by measuring a dc voltage of said pulse width modulated signal for setting said fan motor to provide a predetermined air flow.*

*38. An apparatus for circulating air in a ventilation system, said apparatus comprising:*

*a fan motor responsive to a pulse width of pulses of a pulse width modulated signal to correspond an air flow provided by said fan motor to said pulse width; and*

*a controller generating said pulses of said pulse width modulated signal which are coupled to said fan motor, said controller generating a control signal for setting said pulse width of said pulses to a value corresponding to said control signal and thereby setting said fan motor to provide a predetermined air flow corresponding to said control signal in an open loop manner.*

*39. An apparatus as claimed in claim 38, wherein said controller comprises*

*a waveform generator generating a periodic waveform having a predetermined frequency and a varying amplitude; and*

*a comparator generating said pulse width modulated signal in response to said waveform and said control signal, said pulse width of said pulses being proportional to the amplitude of said control signal.*

*40. An apparatus as claimed in claim 39 wherein said control signal is generated by a manual control device.*

*41. An apparatus as claimed in claim 39 wherein said control signal is generated by a control system.*

*42. An apparatus as claimed in claim 38 wherein said controller generates all of said pulses of said pulse width modulated signal to have a set amplitude so that said pulse width of said pulses can be determined by measuring a dc voltage of said pulse width modulated signal for setting said fan motor to provide a predetermined air flow.*

* * * * *

UNITED STATES PATENT AND TRADEMARK OFFICE

CERTIFICATE OF CORRECTION

PATENT NO. : RE 38,406 E
DATED : January 27, 2004
INVENTOR(S) : Faris et al.

It is certified that error appears in the above-identified patent and that said Letters Patent is hereby corrected as shown below:

Column 5,
Line 45, “the termostat will energize” should read -- the thermostat will energize --;

Column 7,
Line 56, “and the automatid control” should read -- and the automatic control --;

Column 10,
Line 41, “thus dependent of static” should read -- thus independent of static --;

Column 11,
Line 63, “step measuring” should read -- step of measuring --.

Signed and Sealed this

Eighth Day of June, 2004

JON W. DUDAS
*Acting Director of the United States Patent and Trademark Office*